United States Patent [19]

Sucov et al.

[11] 3,934,211

[45] Jan. 20, 1976

[54] METAL HALIDE VAPOR LASER

[75] Inventors: Eugene W. Sucov; Lelland A. C. Weaver, both of Pittsburgh, Pa.

[73] Assignee: Westinghouse Electric Corporation, Pittsburgh, Pa.

[22] Filed: Sept. 11, 1974

[21] Appl. No.: 505,400

Related U.S. Application Data

[63] Continuation of Ser. No. 339,697, March 9, 1973, abandoned.

[52] U.S. Cl........ 331/94.5 G; 331/94.5 PE; 330/4.3
[51] Int. Cl.$^2$............................................ H01S 3/22
[58] Field of Search ... 331/94.5 G, 94.5 P, 94.5 PE; 330/4.3

[56] References Cited
UNITED STATES PATENTS 3,576,500   4/1971   Gould et al.................... 331/94.5 G Primary Examiner—Robert J. Webster
Attorney, Agent, or Firm—D. Schron

[57] ABSTRACT

The invention is directed to a method for obtaining pulsed metal vapor laser transitions. The method comprises placing a metal halide of the desired metal within an enclosure and vaporizing the metal halide to provide a metal halide vapor. The metal halide vapor is thereafter dissociated to provide ground state metal atoms of sufficient number density to create a condition for resonance trapping and, substantially simultaneously therewith, ground state metal atoms are excited to an upper laser level, while maintaining a sufficient number in the ground state to preserve said resonance radiation trapping condition, with electrons sufficiently energized to create a population inversion between the upper and lower laser level. The excited metal atom is permitted to emit laser radiation by stimulated emission to a lower laser level and the emission is resonated, preferably between a pair of externally mounted mirrors. The metal atom is permitted to relax from the lower laser level to ground state and the aforementioned steps are repeated.

14 Claims, 4 Drawing Figures

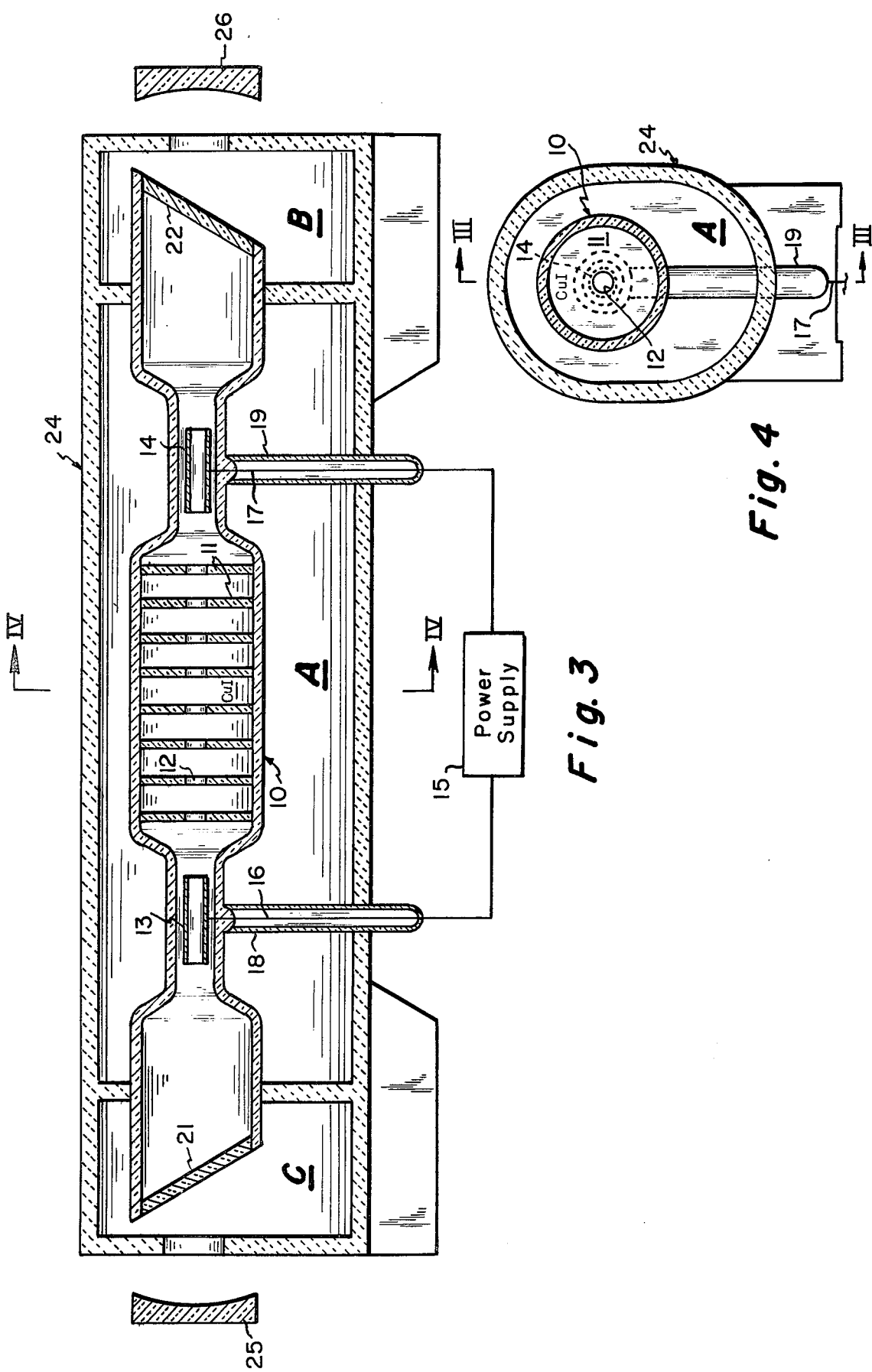

METAL HALIDE VAPOR LASER

This is a continuation of application Ser. No. 339,697 filed Mar. 9, 1973, now abandoned.

FIELD OF THE INVENTION

The present invention relates to metal laser transitions, and, in particular, to metal halide vapor lasers.

BACKGROUND OF THE INVENTION

It is now known that metal vapors are particularly useful in providing high efficiency and high output power lasers. Metal vapor "collision lasers" generally obtain population inversion through an appropriate relationship between electron collisional excitation and relaxation rates; see, e.g., Gould, Appl. Opt. Suppl. Chem. Lasers, p. 59 (1965). Many metal vapor laser transitions are well known, including copper at 5106A, lead at 7229A, and manganese at 5341A and 12899A. However, of the metal vapor laser transitions, the copper 5106A transition is considered one of the most desirable not only because it is in the visible region, but because it has demonstrated the highest efficiency, peak power, and optical gain of all the metal vapor lasers.

Initially, longitudinal discharge tubes employing stationary mixtures of copper:helium were used to obtain laser action in electrically-pulsed copper discharges with temperatures of approximately between 1500° and 1600°C, see Walter, IEEE J. Quant. Electr. QE-4, 355 (1968). Significant advances in copper lasers have been made by employing flowing copper:helium mixtures in transverse discharge tubes at temperatures up to about 2000°C, see Leonard, Final Report, Airborne Laser Development, Contract No. DAHC 60-70-C-0030 Sept. 1970. The utilization of a transverse discharge permits more effective values of electric field to particle density ratio (E/N) to be obtained which results in substantially higher optical gain and laser energy output per unit volume as well as reduces circuit inductance thus permitting rapid current risetimes.

However, in a metal vapor laser and copper in particular, high temperatures are required to obtain sufficient metal vapor pressures. In both the longitudinal and transverse discharge modes, temperatures in excess of about 1200°C and typically from about 1500°C to 1600°C are required to obtain the preferred copper density of $10^{15}$ atoms/cm$^3$ for the necessary gain and excitation efficiencies as well as resonance trapping, as discussed hereinafter.

Various attempts have been made to provide the necessary metal vapor densities without high temperatures by utilizing metal-bearing molecular carriers such as, for example, metal carbonyls and other organic complexes. These attempts have been generally unsuccessful because of the large amount of energy lost in dissociation, excitation or ionization of nonlaser species by the electrical discharge, and by the absorption of laser and resonance radiation by these nonlaser species. Furthermore, the organic carriers, once dissociated, fail to provide a continuing vapor pressure since their dissociation is generally irreversible. Thus, the initial density is not maintained nor are the original species. Also, at the high temperatures required, the dissociated organic materials can absorb or scatter visible radiation as well as deposit on the windows thereby degrading the optical qualities of the laser environment. Moreover, solid deposits of dissociated carrier materials can create conducting paths which short circuit the system. Because of the electronegativity of many dissociated carriers, a large number of the electrons can be removed from the discharge through attachment.

Other attempts have been made to employ inelastic collision to create a population inversion and relax the lower transition level by cyclization rather than simultaneous population-depopulation, see U.S. Pat. No. 3,576,500. However, even with cyclization, high temperatures are required for proper metal vapor densities. It was also implied that copper iodide could be used in a cyclic laser to obtain copper atoms at temperatures below 1000°C. However, later attempts to provide lasing by use of metal halides proved unsuccessful. The problems associated with lasing the metal of a metal halide, as opposed to the pure metal, were not apparent, and the suggestions that lower operating temperatures could be used were not realized. See GTE Laboratories Annual Technical Report TR 72-841-1, ONR (Contract N00014-11-C-0164) 31 Mar. 1972.

Accordingly, for proper metal vapor lasing conditions, particularly in copper, high temperatures are required by present state of the art means. Practical metal vapor laser systems must be, therefore, constructed of materials capable of withstanding high temperatures.

SUMMARY OF THE INVENTION

The present invention provides both a means and a method for obtaining desired metal vapor laser transitions without the need for the high temperatures previously associated with pure metal vapor lasers. Furthermore, the method of the present invention is particularly useful in obtaining the 5106A copper laser transition.

It has been found that the problems inherent in the prior art have been discovered and the present invention provides a method and means for practically solving them. Thus, the invention overcomes the disadvantages and inherent limitations associated with the unsuccessful prior art attempts at providing practical metal vapor transition lasing.

Generally, it has been found that the metal component of a metal halide molecule can be made to lase at temperatures substantially below those required for pure metal vapors. Contrary to prior teachings, it has been found that thermal energies at or below those normally employed in pure metal vapor lasers do not provide adequate atomic densities and, therefore, it is necessary to provide collisional excitation energies with energetic electrons to obtain dissociation of the molecular vapors.

The discoveries of the present invention as well as the methods and means for their practical embodiment are shown and described in particularity below. While the present invention is directed to metal halide vapor lasers, the description of the particular embodiments is addressed to copper iodide, since copper laser transitions are presently under investigation by those skilled in the art for reasons set forth above. The iodide was chosen because of its generally greater vapor pressure and its ability to afford a more diffuse discharge than bromide or chloride vapors. It is also clear that the description of the invention is equally applicable to other metals and halides including halides of manganese, magnesium, lead, thallium, and the like.

For a more precise understanding of the present invention, the following description is to be taken in connection with the accompanying drawings.

BRIEF DESCRIPTION OF THE DRAWINGS

FIG. 3 is a sectional elevation of a longitudinal discharge tube utilizing CuI; and FIG. 4 is a sectional elevation taken along line IV—IV of FIG. 3.

DESCRIPTION OF THE INVENTION

Figure 1:
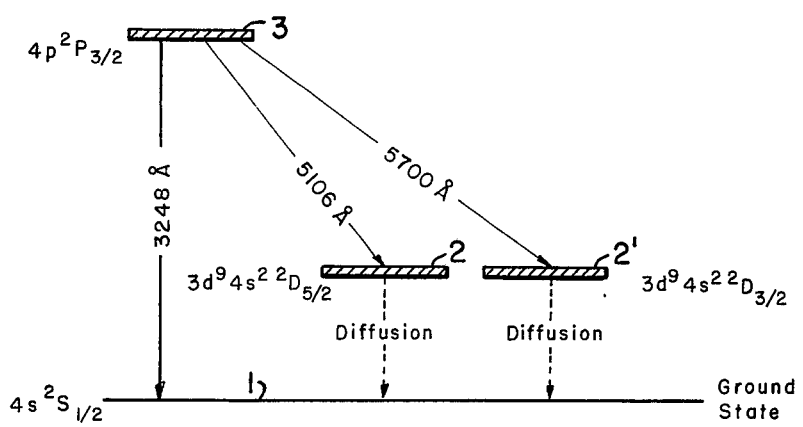
FIG. 1 is a simplified energy level diagram for a copper laser system.

The essential difference between a pure metal vapor laser system and the metal halide vapor laser of the present invention is that pure metal vapor lasers have all of their atoms in the ground state prior to excitation and the metal halide has initially no free atoms in the ground state. Thus, heating a pure metal to a temperature sufficient to produce the required atomic density necessarily produces copper atoms in the ground state. Heating a metal halide, on the other hand, produces a molecular vapor with negligible dissociation, and, therefore, no copper atoms in the ground state.

With copper iodide, for example, it has been found that the vaporized material comprises a mixture of monomers and polymers in which the trimeric structure [$Cu_3I_3$] predominates. The degree of dissociation of the trimer depends upon the reaction rates and concentrations at the temperatures involved. However, the dissociation of $Cu_3I_3$ due to thermal energy is counteracted by the recombination occurring at the higher vapor pressures required for atomic density. Consequently, thermal dissociation is negligible. Dissociation of the molecular complex requires, therefore, collisional energies substantially greater than the ambient thermal energies of the neutral species to provide neutral metal atoms. It has been found that certain threshold energies can be provided by means of an electrical discharge which can also be utilized to pump or excite the dissociated metal atoms to the desired upper laser energy level.

In addition to obtaining sufficient dissociation of the molecular complex, other criteria must be met to obtain lasing. The rate of recombination of the dissociated atoms must be slow in relation to the rate of dissociation. This criterion was found to be satisfied by the metal halide molecular complex when dissociated by means of electrical discharge. Also, the electrical discharge must be selective. That is, not only must dissociation be achieved, but the energy must be transferred to or absorbed by the metal rather than by other material present, such as the halogen atom or molecule or the undissociated metal halide molecules. Unselective discharges would result in energy losses to the other materials present rather than being utilized in exciting the metal to create a population inversion. It is also possible, with a metal halide, to have the selectivity in terms of the electrical excitation of energy levels within the metal halide molecule. Such selectivity would provide for dissociation into an upper laser level of the dissociated metal atom by exciting the metal halide vapor molecules to an energy level at least as high as the desired upper laser level of the metal atom. This selectivity would permit excitation in upper laser levels within metal species not normally available to direct excitation, for example, an upper level not spectroscopically connected to the ground state, i.e., where no strongly allowed optical transition occurs between the upper laser level and the ground state.

It was also unexpectedly found that a diffuse electrical discharge could be maintained, notwithstanding the fact that halides and halogens are strongly electronegative and, therefore, have a tendency to form constricted arc discharges in which the excited state populations are determined by Boltzmann equilibrium relationships. That is, the halide provided a nonequilibrium glow rather than populating the higher energy levels in an equilibrium fashion in which laser population inversions are impossible.

It was also found that the halogen atom and molecular halide complex did not impair the optical characteristics. Even though halogen atoms and molecules have relatively wide absorption spectra they were found to absorb less than 2percent of the desired laser radiation emission. Further, the halogen atoms and molecules did not absorb laser radiation and resonance radiation emission, for example copper 3248A uv line which would impair the ability to obtain radiation trapping of the upper laser level. The use of carbonyls as carriers in the prior art, on the other hand, were known to absorb the uv lines in copper lasers, and prevented the establishment of adequate population inversions for laser action.

A condition inherently present in a pure metal vapor laser having sufficient metal atom density, not present in a metal halide system, is the resonance radiation trapping condition. Resonance radiation trapping occurs when the ground state atomic density is sufficiently large to absorb most of the resonance radiation transitions of the atoms which terminate on this ground state, thereby substantially preventing such radiation from escaping from the discharge region. This reabsorbed radiation increases the effective radiative lifetime of the atomic levels from which it originates. Notwithstanding the fact that metal halides were found to be selectively dissociated and possessed proper optical characteristics, lasing was not practical unless a resonance trapping threshold level could be achieved. In a pure metal vapor at densities sufficient to produce trapping, the upper laser level lifetime is approximately 617 nsec, which provides sufficient time in which to pump from the ground state to the upper level. In a metal halide vapor system satisfying the electrical and optical criteria of the pure metal, on the other hand, the upper energy level lifetimes were typically found to be less than about 200 nsec, requiring extremely fast pump risetimes.

It was found that rapid leakage of 3248A resonance radiation from the upper state to the ground state was occurring notwithstanding the satisfaction of optical and electrical discharge criteria, see FIG. 1. With CuI for example, at a temperature of less than 350°C, corresponding to a ground state density-discharge tube radius (R = 1.3 cm) product of $1.3(10)^{13}$ cm$^2$ or a dissociation level of about 0.001percent, the upper laser energy level lifetime was about 10 nsec. Accordingly, to obtain a population inversion at that temperature it is necessary to have a current risetime substantially less than 10 nsec. To obtain a practical lasing system, therefore, the upper level lifetime must be increased.

In metal halides, the ground state 1 population greatly influences the laser population inversion through trapping resonance radiation from the upper level 3 to the ground state 1. Thus, it was found that if the ground state level 1 is sufficiently populated so that significant absorption of the emitted resonance radiation can occur, then the effective lifetime of the radiating level can be increased.

Figure 2:
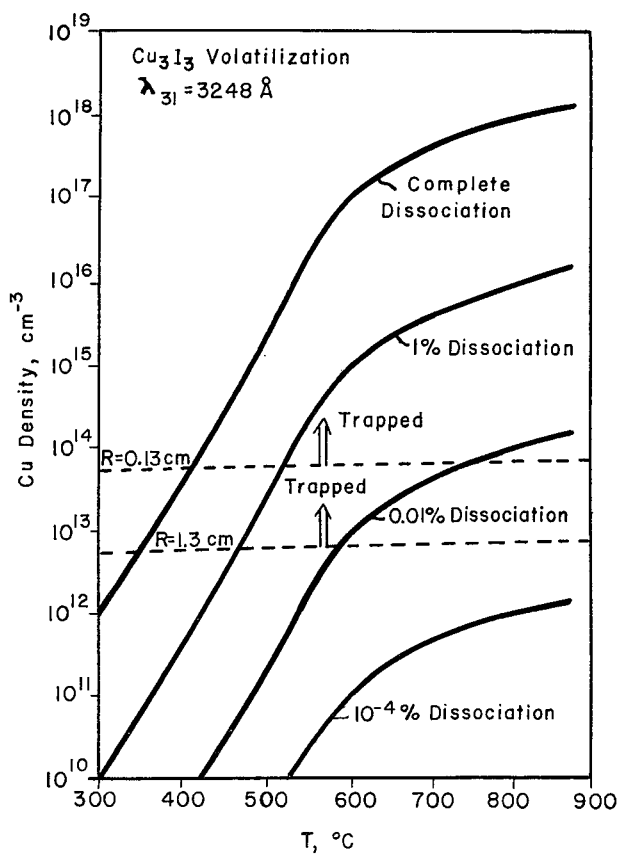
FIG. 2 is a graphical representation of copper density as a function of temperature at various molecular dissociations to provide a trapped condition.

FIG. 2 sets forth graphically the copper atom density as a function of temperature for several fractions of molecular dissociation to achieve trapped conditions for R = 0.13 cm and 1.3 cm discharge tubes. For example, in an R = 1.3 cm discharge tube at 100 percent dissociation of $Cu_3I_3$, no trapping occurs below 350°C. On the other hand, for 0.01 percent dissociation a temperature of 585°C is required to achieve a trapped condition. Accordingly, it is necessary in the present invention to have sufficient thermal energy present to provide a high molecular vapor pressure to obtain a statistically high absolute dissociation level of the molecular complexes, especially where percentage dissociation is low. Thus, it is preferable to maintain the percentage or relative dissociation level greater than about $10^{-3}$ percent and the temperature above 350°C. In operating the metal halide vapor within the preferred ranges, upper laser lifetimes of 617 nsec can be achieved.

To obtain levels of dissociation greater than the minimum preferred levels as well as excitation to the upper laser level, it is preferred that the current density of the discharge be approximately 100 amperes $cm^{-2}$. In other metal halides, it is contemplated that a current density of from about 50 to 500 amperes $cm^{-2}$ is suitable. Also, a discharge current risetime of about 50 nsec and preferably about 20 to 30 nsec is satisfactory to provide population inversion. These values may vary according to the upper laser level lifetime, 617 nsec in the trapped mode. To provide independent control over the electrical discharge characteristics, it is preferable to utilize a buffer gas in an amount from about 1 to 50 torr and preferably from about 5 to 10 torr. Suitable buffer gases include helium, argon, neon, nitrogen and the like. Argon has been found to be particularly well suited for use with copper iodide.

The electrical energy must be injected to produce electrons by ionization to establish the population inversion by selective electron excitation. Since the mean electron energy required is at least 2 eV and approximately > 4 eV to excite upper laser level 3 in copper, it has been found that an energy of about 5 to 10 eV is adequate for selective excitation of the upper level. Thus, the addition of a buffer gas, e.g. He, to the discharge is beneficial, since an excess of the high ionization potential of the gas, ca. 24.6 eV, tends to increase the average electron energy. The buffer gas partial pressure and the applied electric field should, therefore, be adjusted to maintain a mean electron energy of > 5 eV. Higher electron energies, however, may be used without diminishing the effectiveness of the selective excitation or electron production.

Referring to FIG. 3, a means is shown for obtaining 5106A emissions from CuI. A discharge tube 10 is provided which is preferably made of quartz and is filled with a CuI powder. Discharge tube 10 includes a plurality of closely spaced annular discs 11 also preferably made of quartz. Discs 11 have openings 12 which are aligned along the optical axis of discharge tube 10. In longitudinal discharge tubes, such as shown in FIG. 3, it has been found that self-inductance limits the risetime of the electrical discharge. Discs 11 provide an increased path length along the walls between the discharge electrodes to constrain the discharge to the central gaseous core rather than along the walls.

A pair of cylindrical electrodes 13 and 14 are provided along the optical axis for creating the electrical discharge therebetween. Alternatively, a pair of plate electrodes can be placed transversely to the optical axis to effectuate a discharge therebetween which is transverse to the optical axis. By means of a transverse discharge, discs 11 can be eliminated. Electrodes 13 and 14 whether aligned longitudinally along the optical axis as shown in FIG. 3 or transversely positioned are preferably made from molybdenum.

Electrodes 13 and 14 are connected to a power source 15 by leads 16 and 17 respectively. Leads 16 and 17 are preferably enclosed within vacuum sheaths 18 and 19, respectively. Because discharge tube 10 is preferably operated within an oven, the leads must pass through both a hot region and a cold region. It has been found that the leads when exposed to both the heat of an oven and air tend to oxidize and crack the quartz seal. Accordingly, it is preferred to enclose the leads in a vacuum sheath as they pass through the boundary between hot and cold regions.

Discharge tube 10 also includes a pair of Brewster angle windows 21 and 22. Alternatively, a pair of Brewster angle windows may be positioned at each end of the discharge tube. In the space between the two windows of each pair is provided a vacuum to minimize convectional currents which may tend to impair optical quality.

In order to provide adequate temperature conditions for resonance trapping, as well as to avoid condensation of vapors on the windows and walls of the tube, discharge tube 10 is placed in oven 24. Preferably, oven 24 is divided into three sections, for example, one inner section A and two outer sections B and C. For example, in the operation of discharge tube 10 to obtain 5106A copper laser transition from CuI, section A is maintained at a temperature of about 675°C and sections B and C are maintained at about 750°C. Since the coldest location in the discharge tube determines the effective vapor pressure of the system, it is preferable to maintain the area of discharge, i.e. between the electrodes, cooler than the windows. This also prevents condensation on the windows. In the event a pair of windows are utilized at each end of discharge tube 10, it is preferable to maintain the inner set of windows within the oven and the outer windows outside of the oven. Also positioned along the optical axis, but outside of said oven, are a pair of mirrors 25 and 26 for resonating the stimulated emission to provide optical feedback, for increasing intensity, beam directivity, coherence, etc. Mirror 25 is preferably 100 percent reflective at the desired laser wavelength whereas mirror 26 is about 90 percent reflective at that wavelength.

Also it has been found that any deposition of copper on the walls of the discharge tube can be removed by free iodide atoms during recombination when the temperature conditions within the discharge tube are appropriate.

In preparing the system described above, certain precautions must be exercised or the system will fail to operate. Discharge tube 10 as well as the copper iodide must be vacuum baked prior to filling, e.g. for tube 10 at temperatures less than 1000°C and for CuI a temperature less than 400°C are preferred. All water vapor must be removed from both the tube and the CuI powder. Furthermore, the CuI must be maintained out of contact with the air or any oxidizing agent. When using a buffer gas, it must be spectroscopically pure. Preferably, discharge tube 10 is filled, after baking, in a controlled environment such as a dry argon flush. These precautions are critical to the successful operation of the system.

While presently preferred embodiments of the invention have been shown and described in particularity, it may otherwise be embodied within the scope of the appended claims.

What is claimed is:

1. A method for obtaining pulsed metal vapor laser transitions at temperatures substantially below the metal vaporization temperature, said method comprising:
  A. placing a metal halide of the desired metal within an enclosure;
  B. vaporizing said metal halide by heating said metal halide to a temperature not substantially in excess of that required to provide a high molecular vapor pressure, said temperature level being such as to prevent substantial thermal dissociation of said metal halide;
  C. at a temperature not substantially greater than said vaporizing temperature
    i. collisionally dissociating the metal halide vapor with energized electrons to provide ground state metal atoms of sufficient number density to create resonance radiation trapping, and substantially simultaneously therewith
    ii. creating a population inversion between a desired upper laser level and lower laser level of said metal by exciting ground state metal atoms with energized electrons and maintaining a sufficient number of metal atoms in the ground state to preserve said resonance radiation trapping,
  said energized electrons of steps (i) and (ii) being produced by ionization and having a mean electron energy of at least that required to excite the upper laser level of said metal atom;
  D. permitting said excited metal atoms to emit laser radiation by stimulated emission to low laser level and resonating said emission; and
  E. permitting said metal atom to relax from said lower laser level to said ground state and repeating steps C, D and E.

2. A method as set forth in claim 1 wherein a buffer gas is added to said enclosure.

3. A method as set forth in claim 1 wherein collisional dissociation and excitation is achieved by a current density discharge of about from 50 to 500 amps $cm^{-2}$.

4. A method as set forth in claim 2 wherein said buffer gas is added in amounts from about 1 to 50 torr.

5. A method as set forth in claim 1 wherein said electrons are energized to at least 2 eV.

6. A method as set forth in claim 5 wherein said electron energy is between about 4 and 10 eV.

7. A method for obtaining pulsed copper vapor laser transitions at a temperature substantially below the vaporization temperature of copper, said method comprising:
  A. placing a copper halide within an enclosure;
  B. vaporizing said copper halide by heating said copper halide to a temperature not substantially in excess of that required to provide a density-enclosure radius product of at least $10^{13}$ $cm^{-3}$, said temperature level being such as to prevent substantial thermal dissociation of said metal halide;
  C. at a temperature not substantially greater than said vaporizing temperature
    i. collisionally dissociating the copper halide vapor with energized electrons to provide ground state metal atoms of sufficient number density to create resonance radiation trapping, and substantially simultaneously therewith
    ii. creating a population inversion between a desired upper laser level and a lower laser level in said copper atom by exciting ground state copper atoms with energized electrons and maintaining a sufficient number of metal atoms in the ground state to preserve said resonance radiation trapping,
  said energized electron of steps (i) and (ii) being produced by ionization and having a mean electron energy of at least that required to excite the upper laser level of said metal atom;
  D. permitting said excited copper atom to emit laser radiation by stimulated emission to a lower laser level and resonating said emission; and
  E. permitting said copper atom to relax from said lower laser level to said ground state and repeating steps C, D and E.

8. A method as set forth in claim 7 wherein said copper halide is copper iodide.

9. A method as set forth in claim 7 wherein a buffer gas is added to said enclosure.

10. A method as set forth in claim 7 wherein collisional dissociation and excitation is achieved by a current density discharge of about 100 amps $cm^{-2}$.

11. A method for obtaining pulsed metal vapor transitions at a temperature substantially below the vaporization temperature of said metal between an upper laser level and a lower laser level, said method comprising:
  A. placing a metal halide of desired metal within an enclosure;
  B. vaporizing said metal halide by heating said metal halide to a temperature not substantially in excess of that required to provide a high molecular vapor pressure, said temperature level being such as to prevent substantial thermal dissociation of said metal halide;
  C. collisionally exciting the metal halide vapor molecules to an energy level at least as high as the desired upper laser level of said metal with electrons produced by ionization and having a mean electron energy of at least that sufficient to dissociate and excite said metal atoms within said molecule to the desired upper laser level;
  D. permitting the metal atoms of said excited molecule to dissociate from said excited molecule into said upper laser level and to emit radiation by stimulated emission to a lower laser level and resonating said emission; and
  E. permitting said metal atom to relax to ground state and recombine to said metal halide and repeating said steps C, D and E.

12. A method as set forth in claim 11 wherein a buffer gas is added to said enclosure.

13. A method for obtaining pulsed metal vapor transitions at a temperature substantially below the vaporization temperature of said metal, said method comprising:

A. placing a metal halide of the desired metal within an enclosure;
B. vaporizing said metal by heating said metal halide to a temperature not substantially in excess of that required to provide a high molecular vapor pressure, said temperature level being such as to prevent substantial thermal dissociation of said metal halide;
C. collisonally exciting the metal halide vapor molecules to an upper energy level at least as high as the desired upper laser level of said metal with electrons produced by ionization and having a mean electron energy sufficient to dissociate and excite said metal atoms within said molecule to the desired upper laser level, said dissociation providing ground state metal atoms of sufficient number density to create a condition for resonance radiation trapping and said excitation being sufficient to create population inversion while maintaining a sufficient number of metal atoms in said ground state to preserve said resonance radiation trapping;
D. permitting the metal atoms of said excited molecule to dissociate from said excited molecule into said upper laser level and to emit radiation by stimulated emission to a lower laser level and resonating said emission; and
E. permitting said metal atom to relax to ground state and recombine to said metal halide, repeating steps C, D and E.

14. A method as set forth in claim 13 wherein a buffer gas is added to said enclosure.

* * * * *